No. 711,409. Patented Oct. 14, 1902.
M. J. MAPES.
BROODER.
Application filed Jan. 11, 1902.
(No Model.) 2 Sheets—Sheet 1.

WITNESSES:
J A Brophy
B F Owens

INVENTOR
Marion J. Mapes
BY Munn & Co
ATTORNEYS

No. 711,409. Patented Oct. 14, 1902.
M. J. MAPES.
BROODER.
(Application filed Jan. 11, 1902.)

(No Model.) 2 Sheets—Sheet 2.

WITNESSES:
J. T. Brophy
J. B. Owens.

INVENTOR
Marion J. Mapes
BY Munn & Co.
ATTORNEYS

UNITED STATES PATENT OFFICE.

MARION J. MAPES, OF SPRINGVALLEY, NEW YORK.

BROODER.

SPECIFICATION forming part of Letters Patent No. 711,409, dated October 14, 1902.

Application filed January 11, 1902. Serial No. 89,300. (No model.)

*To all whom it may concern:*

Be it known that I, MARION J. MAPES, a citizen of the United States, and a resident of Springvalley, in the county of Rockland and State of New York, have invented a new and Improved Brooder, of which the following is a full, clear, and exact description.

This invention relates to an apparatus for sheltering young chickens, and particularly those which have been hatched by means of incubators; and the invention embodies various novel features of construction which enable me to more effectively and uniformly heat the brooder without in any way interfering with the proper ventilation thereof. The invention also involves features which may be used to advantage in incubators.

This specification is a specific description of one form of the invention, while the claims are definitions of the actual scope thereof.

Reference is to be had to the accompanying drawings, forming a part of this specification, in which similar characters of reference indicate corresponding parts in all the views.

Figure 1:
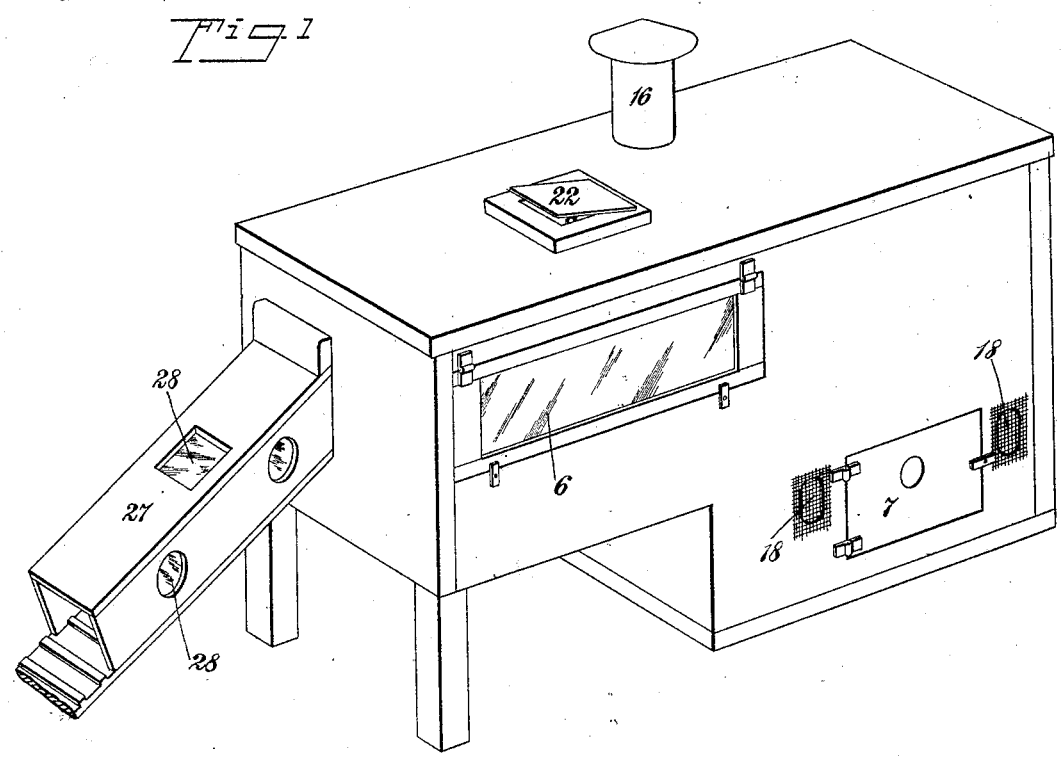
Figure 2:
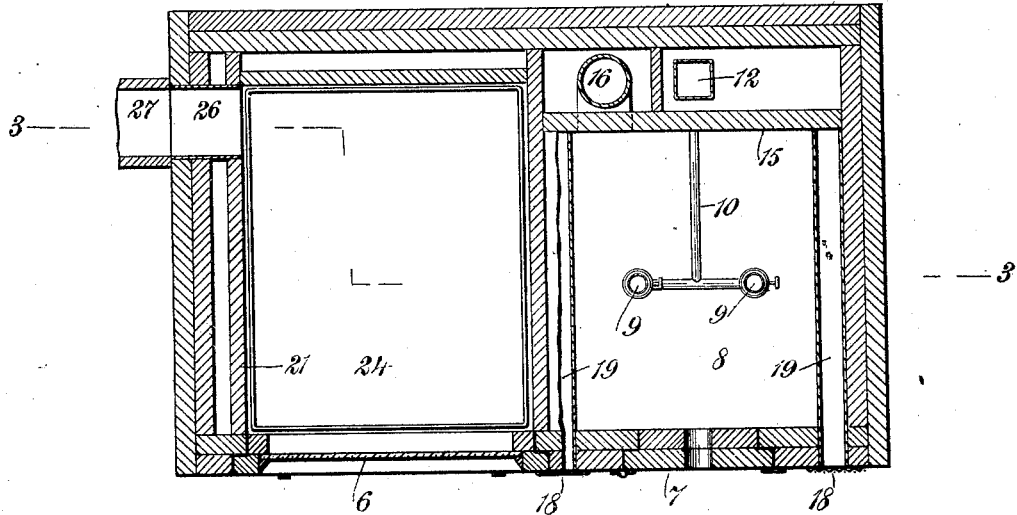
Figure 3:
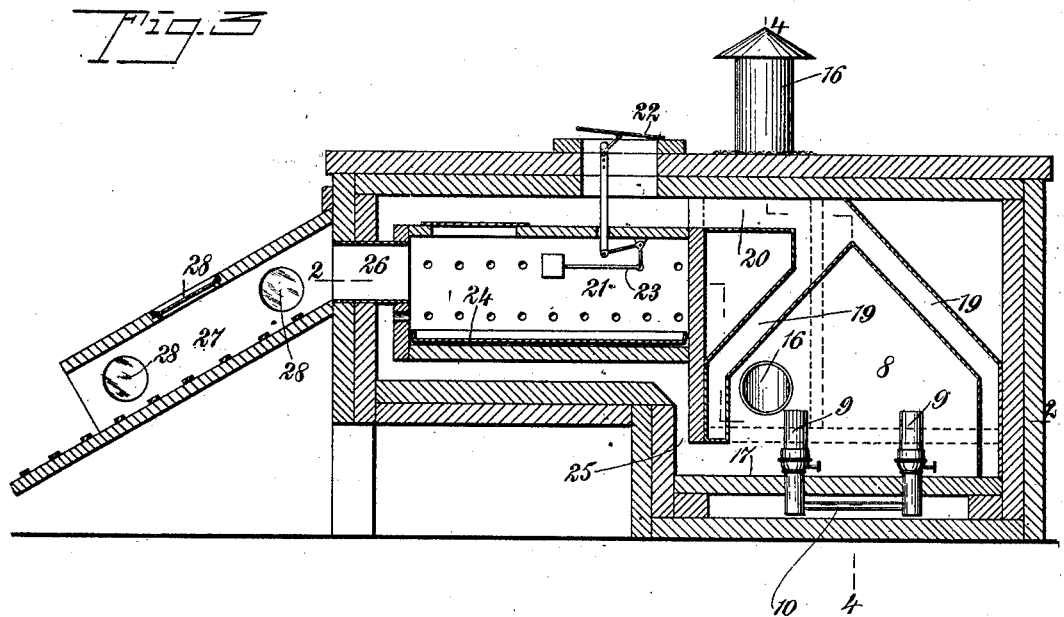
Figure 4:
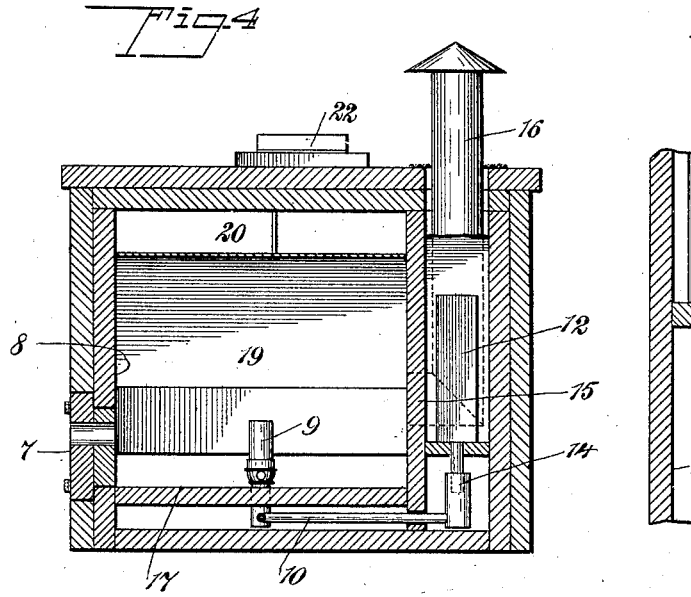
Figure 5:
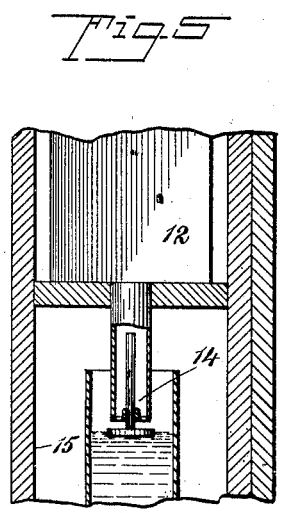

Figure 1 is a perspective view of the invention. Fig. 2 is a section on the line 2 2 of Fig. 3. Fig. 3 is a sectional view on the line 3 3 of Fig. 2. Fig. 4 is a sectional view on the line 4 4 of Fig. 3, and Fig. 5 is a detail section showing the oil-feed device.

As shown in Fig. 1, the apparatus has stationary exterior walls forming a casing or inclosure for the parts within the brooder. At the front of the brooder a door 6 is provided to enable the chicks to be placed in or taken from the brooder, and a door 7 is also provided, which enables access to be had to the lamp for lighting and trimming the same. The door 7 communicates with a heater-space 8, (see Figs. 2 and 3,) in which space is arranged one or more lamps 9. These lamps are connected by a T-shaped tube 10 to an oil-reservoir 12, (see Figs. 4 and 5,) and this oil-reservoir feeds the oil to the tube 10, the feed being controlled by a suitable valve device 14, which maintains the oil at the proper level, as will be understood. The oil-reservoir 12 and the valve-controlled feed 14 are separated from the heating-chamber 8 by an interior wall 15. 16 indicates a smoke or draft pipe which communicates with the heating-chamber 8, as best shown in Fig. 3, and which passes rearward back of the wall 15 and thence out through the top of the casing. A false bottom 17 is placed over the tube 10, so as to protect the same from the heat of the lamps.

As illustrated in Figs. 1 and 2, the front wall of the casing is provided with gauze-covered openings 18, which permit fresh air to be admitted into the air-passages 19. These air-passages pass upward and inward in inverted-V-shape form over the lamps 9 and at the upper ends communicate with the horizontal air-passage 20, passing under the roof or top of the casing. The horizontal passage 20 leads over the top of the chick box or compartment 21. This box 21 is rectangular in form and lies in the exterior casing at one side of the chamber 8, the box being of suitable construction and being arranged to have the air from the passage 20 pass entirely around it, as shown. The side walls of the box 21 are perforated, (see Fig. 3,) so that the warm air from the heater-passages may circulate freely through the box. 22 indicates a damper in the top of the exterior casing, so as to control the damper thereof, and this damper is controlled by a thermostat 23 of any suitable form, the thermostat being located in the box or compartment 21. The door 6 communicates with the chick-box 21, as shown in Fig. 2. 24 indicates a tray or removable bottom in the box 21, which facilitates the ready cleaning thereof. The warm air from the passage 20 circulates around the various sides of the chick-box 21 and thence down under the same and into the base of the compartment 8 by way of a passage 25. Now it will be seen that the cold fresh air will enter at the openings 18 and pass through the passages 19 and 20, at which time the air is heated by the lamps 9, and thence circulates through the chick compartment or box, warming the same. The thermostat 23 and damper 22 enable the temperature of the chick-box to be accurately regulated. The air thus used in the chick-box passes down under the same and through the passage 25 into the compartment 8, from which it escapes by the chimney or stack 16. By these means a constant circulation of warm heated air is maintained in the chick-box, and the temperature may be accurately and thoroughly regulated by the thermostat and the damper actuated thereby.

Communicating with the chick box or compartment 21 by way of a tube or passage 26 is a downwardly-inclined run 27, which is closed at its top, bottom, and sides until a point held below the passage 26 is reached, at which point the run opens into the atmosphere, and the bottom of the run, constituting the run proper, continues down to the ground or base line. (See Fig. 3.) The arrangement of this run in the manner described is one of the leading features of my invention, for by this means the chicks are free to pass into the open air at any time, and yet the circulation of warmed air in the chick-compartment is not interfered with. Therefore the chicks may retire at any time to the warm box or compartment 21 and when they desire may go into the open air, the way being always open, and yet the cold air from the outside is kept from entering the chick box or compartment, owing to the arrangement of the lower end of closed run at a point below the passage 26. The warm air in the brooder will tend to rise and will not be displaced by the cold air outside, nor will the warm air in the brooder flow downward against the cold air outside of the brooder. It therefore follows that the thorough circulation of the warm air outside is in no way affected by this opening into the atmosphere. Glass windows 28 may be provided in the closed portion of the run 27, thus giving light to the run and also to the interior of the chick-box 21. This box or compartment is fully and principally lighted by the door 6, which is of glass.

The arrangement of the lamps is such that the air for supporting combustion is drawn through the hot-air passages and not directly from the atmosphere. This insures a proper circulation through the brooder and does not incur the danger of introducing the gases from the lamp-frame into the chick-compartment. The lamp-box is made of such size that it does not heat the air to such an extent as to deprive it of its moisture, which is well known to be an advantage not only in brooders, but in incubators. The lamps are made of cast-iron, which is preferable to other materials. If desired, steam or hot water pipes may be employed for heating instead of the lamps.

The exterior walls of the brooder may be constructed in any manner calculated to retain the same. For example, they may be made of double thicknesses of wood, with felt, paper, or other substance between them. The glass doors and windows may also be made of double thickness, with a dead-air space between them, and various other changes in the form, proportions, and details of my invention may be resorted to at will without departing from the spirit of my invention. Hence I consider myself entitled to all forms of the invention as may lie within the intent of my claims.

Having thus described my invention, I claim as new and desire to secure by Letters Patent—

1. A brooder, comprising a heating-chamber, a heating device in said chamber, a chick-chamber having a passage surrounding it, said passage communicating with the lower portion of the heating-chamber, and air-passages communicating with the outer air, and extending over the top of the heating-chamber to and communicating with the air-passage surrounding the chick-chamber, as set forth.

2. A brooder, comprising a heating-chamber, a heating device in said chamber, a chick-chamber having a passage surrounding it, said passage communicating with the lower portion of the heating-chamber, air-passages communicating with the outer air and extending upwardly and inwardly toward each other over the top of the heating-chamber, said passage communicating at the top with the passage surrounding the chick-chamber, as set forth.

3. A brooder, comprising a heating-chamber having air-passages extending upwardly and inwardly toward each other and forming the top of said chamber, a heating device in the heating-chamber, and a chick-chamber having a passage surrounding it, said passage communicating with the lower portion of the heating-chamber and with the air-passages of said heating-chamber, as set forth.

4. A brooder, comprising a heating-chamber having air-passages extending upwardly and inwardly toward each other and forming the top of the same, a heating device in said chamber, a chamber at one side of the heating-chamber, a draft-pipe leading from the heating-chamber into the chamber adjacent thereto and out through the same, and a chick-chamber having a passage surrounding it, said passage communicating with the lower portion of the heating-chamber and with the air-passages of said chamber, as set forth.

5. A brooder, comprising a heating-chamber having air-passages forming the top thereof, a chamber at one end of the heating-chamber, a burner in the heating-chamber, a fuel-supply arranged in the chamber at one side of the heating-chamber and connected with the burner, a draft-pipe leading from the heating-chamber up through the chamber in which the fuel-supply is arranged, and a chick-chamber having an air-passage surrounding it, said passage communicating with the lower portion of the heating-chamber and with the upper portion of the air-passages of said chamber, as set forth.

6. A brooder, comprising a heating-chamber having air-passages forming the top thereof, a heating device in said chamber, a chick-chamber having a passage surrounding it, said passage communicating with the heating-chamber and the air-passages thereof, a valve controlling an opening leading into the passage that surrounds the chick-chamber, and means for automatically controlling said valve, as set forth.

7. A brooder, consisting of a heating-chamber having air-passages extending upwardly and inwardly toward each other over the top of said chamber, a chamber at one end of the heating-chamber, burners in the heating-chamber, a fuel-supply in the chamber at one end of the heating-chamber and communicating with the burners, a draft-flue leading from the heating-chamber up through the chamber in which the fuel-supply is arranged, a chick-chamber having a passage surrounding it, said passage communicating with the heating-chamber and with the air-passages thereof, an automatic valve controlling an opening leading to the passage surrounding the chick-chamber, and an inclined run communicating with the chick-chamber as set forth.

In testimony whereof I have signed my name to this specification in the presence of two subscribing witnesses.

MARION J. MAPES.

Witnesses:
I. B. OWENS,
JNO. M. RITTER.